No. 754,926. PATENTED MAR. 15, 1904.
B. HOLTHAUS.
HARVESTER.
APPLICATION FILED DEC. 11, 1903.
NO MODEL. 2 SHEETS—SHEET 1.

WITNESSES:
H. H. Schott
Edwin G. Balinger

INVENTOR
Bernard Holthaus
BY
Georgii T Massie
his Attorneys

No. 754,926. PATENTED MAR. 15, 1904.
B. HOLTHAUS.
HARVESTER.
APPLICATION FILED DEC. 11, 1903.
NO MODEL. 2 SHEETS—SHEET 2.

No. 754,926. Patented March 15, 1904.

UNITED STATES PATENT OFFICE.

BERNARD HOLTHAUS, OF OLDENBURG, GERMANY.

HARVESTER.

SPECIFICATION forming part of Letters Patent No. 754,926, dated March 15, 1904.

Original application filed June 11, 1903, Serial No. 159,702. Divided and this application filed December 11, 1903. Serial No. 184,751. (No model.)

*To all whom it may concern:*

Be it known that I, BERNARD HOLTHAUS, a citizen of the Empire of Germany, residing at Oldenburg, Germany, have invented certain new and useful Improvements in Harvesters, (this being a division of my application filed June 11, 1903, Serial No. 159,702;) and I do hereby declare the following to be a full, clear, and exact description of the invention, such as will enable others skilled in the art to which it appertains to make and use the same.

This invention relates to harvesters; and its object is to improve the mechanism for receiving and delivering the cut grain or grass, so that the freshly-cut grain will be prevented from falling onto the platform while that comprising the sheaf last cut is being delivered.

In order to render the invention easily understood, reference is had to the accompanying drawings, in which like reference-numerals indicate similar parts throughout.

Figure 1:
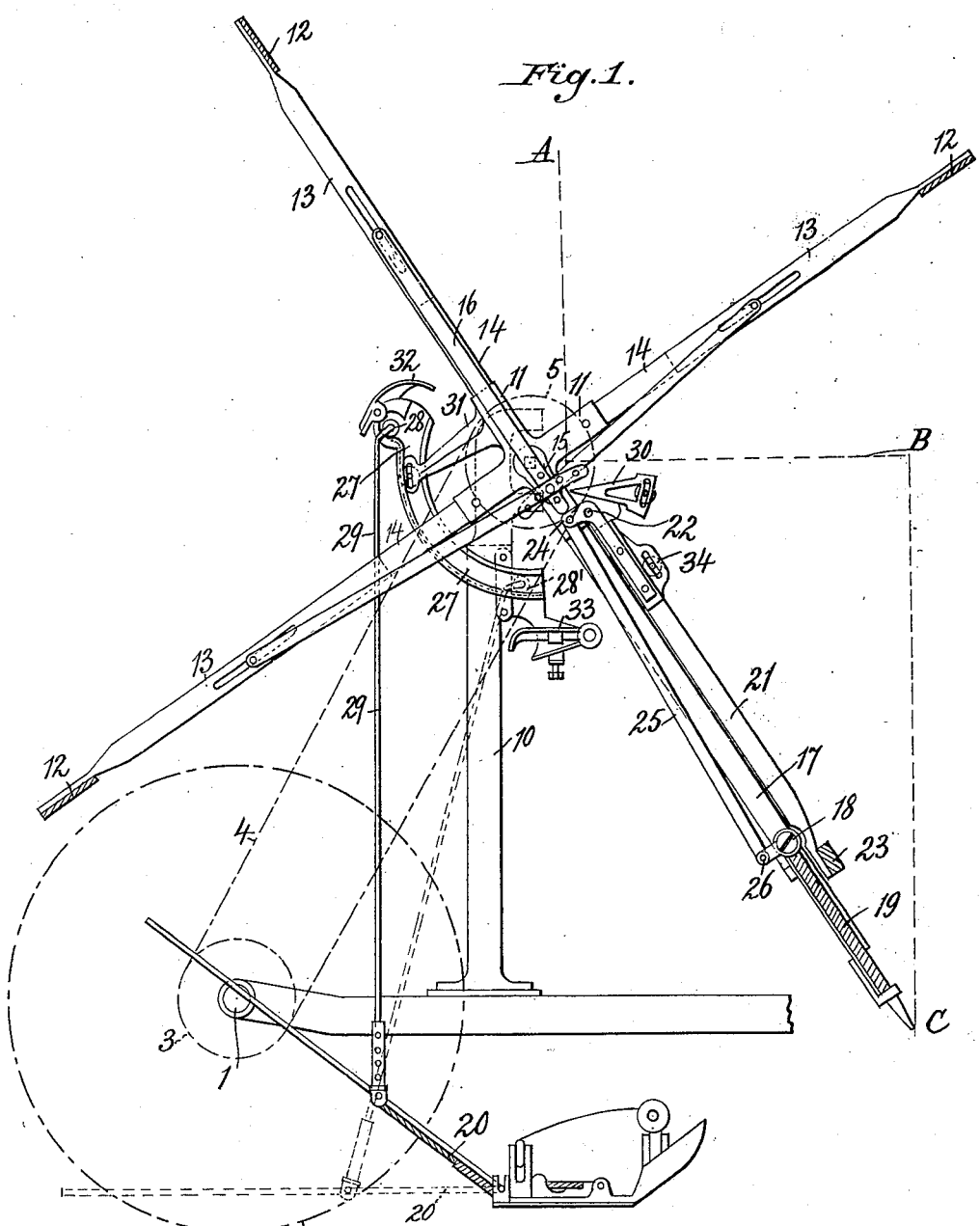
Figure 2:
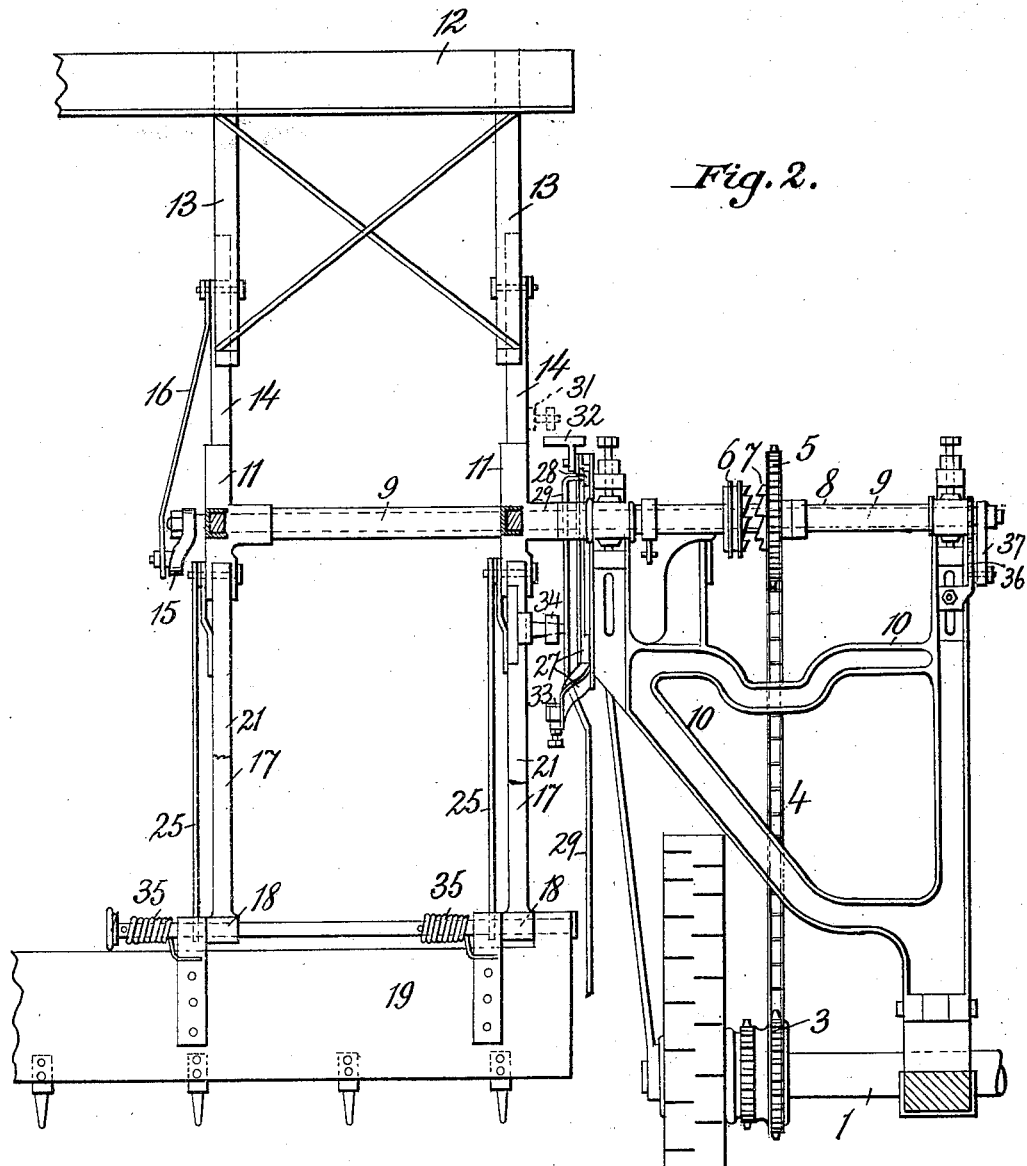
Figure 3:
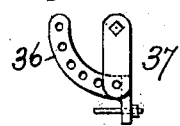

In the drawings, Figure 1 represents in side elevation my invention as applied to a harvester. Fig. 2 is a sectional elevation on the line A B C of Fig. 1, and Fig. 3 is a detail of certain adjusting means.

Referring to the drawings, the axle 1 of the main driving-wheels 2 imparts its motion by means of the chain-wheel 3 and the chain 4 to a chain-wheel 5, carried upon one-half of a clutch mechanism 6 and 7, fixed upon a hollow sleeve 8, arranged to rotate loosely upon a stationary shaft 9. This shaft 9 is carried by a frame 10, which is fixed to the body of the machine. The sleeve 8 carries two spaced star-wheels 11, having preferably four rays or arms. Three transverse blades 12 for feeding the uncut grain to the knives are mounted upon two-part arms 13, the members of which arms are slidably mounted one upon the other, the inner members 14 being fixed to the rays of the star-wheel. Upon the end of the stationary shaft 9 is mounted a crank 15, to which the movable parts 13 of the arms are connected by means of links or rods 16, by means of which the transverse blades are given a reciprocating movement to and from the axis of the reel. The fourth ray of the star-wheel carries a fixed arm 17, to the outer end of which is pivoted, at 18, a rake 19, which serves to deliver or discharge the cut grain from the platform 20. Another arm, 21, is pivoted to a projection of the star-wheel at 22 at a point close to the fixed arm 17. This arm 21 carries a transverse bar 23, the function of which will be more fully explained hereinafter. A lateral projection 24 of the arm 21 is connected, by means of a rod 25, with a lateral projection 26 from the rake 19.

For the purpose of tilting the grain-platform 20 a segmental guide-plate 27 is mounted upon the frame of the machine concentric to the axis of the reel. Within the guide-plate is adapted to travel a roll 28, connected, by means of a rod 29, with the platform. A lateral arm 30, carried by the star-wheel, enters the guide 27 upon each revolution of the reel and pushes the roll 28 from its position at 28' into the recess at the top of the guide-plate, effecting in this way a raising of the rack from the position shown in dotted lines to that shown in full lines in Fig. 1. Upon the further revolution of the reel another arm, 31, passes through the guide-plate and trips the lever 32, which discharges the roll 28 from the recess and causes the same to fall by gravity to the position shown in dotted lines, thus lowering the platform. It will thus be seen that the platform is raised and lowered at each revolution of the reel.

A relative movement is imparted to the rake 19 and the transverse bar 23 in the following manner:

A straight guide 33 is mounted on the frame 10 or the segmental guide-plate 27, and a roll 34 is carried by the arm 21. The relation of the guide 33 and the roll 34 to each other is such that as the reel revolves the roll contacts with the guide, and the forward movement of the arm 21 is thereby temporarily retarded, while the fixed arm 17, carrying the rake 19, continues its onward movement. The retarding of the arm 21 and the transverse bar 23 constitutes of said bar 23 a barrier to temporarily prevent the freshly-cut grain from falling upon the platform 20. At the same time the onward movement of the arm 17 causes the lateral projection 24 to transmit, by means of the rod 25' and the projection 26, a sudden backward movement to the fingers of the rake 19 against the tension of the spring 35. The further progression of the reel causes the roll 34 to assume a position in which it can pass the guide-plate 33, and the obstacle being removed the spring 35 causes the rake 19 to spring suddenly forward, discharging the grain from the rack or platform 20, which is at this time dropped to the position shown in dotted lines.

In order to effect an adjustment whereby the blades 12 will feed the standing grain to the knives at a time corresponding to the nature of the ground, the height of the grain, &c., a segmental arm 36 is bolted to the frame and provided with a number of apertures, in which may be adjusted a lever 37, fixed upon the end of the shaft 9, whereby the shaft may be partially rotated and the point of maximum throw of the arms be varied.

Having thus fully described my invention, what I claim as new, and desire to secure by Letters Patent, is—

1. In a harvester, the combination, with a grain-platform, and a rotary reel, of a rake pivotally mounted on the reel and serving to discharge the cut grain from the platform, an arm pivotally mounted on the reel, a transverse bar carried by the arm, a connection between the arm and the rake, and means for retarding the motion of the arm, whereby the rake will discharge the grain from the platform and the transverse bar will serve to prevent the deposit of freshly-cut grain during such discharge.

2. In a harvester, the combination, with a grain-platform, and a rotary reel, of a rake pivotally mounted on the reel and serving to discharge the cut grain from the platform, an arm pivotally mounted on the reel, a transverse bar carried by the arm and occupying a position immediately behind the rake, a connection between the arm and the rake, and means for retarding the motion of the arm, whereby the rake will discharge the grain from the platform and the transverse bar will serve to prevent the deposit of freshly-cut grain during such discharge.

3. In a harvester, the combination, with a grain-platform, and a rotary reel, of a rake pivotally mounted on the reel and serving to discharge the cut grain from the platform, an arm pivotally mounted on the reel, a transverse bar carried by the outer end of the arm, a projection from the opposite end of said arm, a projection from one side of the rake, a connection between said projections, and a projection from a fixed portion of the apparatus operating to retard the onward movement of the arm, whereby the rake will be actuated in such manner as to facilitate the discharge of the grain from the platform and the transverse bar will serve to prevent the deposit of freshly-cut grain during such discharge.

4. In a harvester, the combination, with a grain-platform, and a rotary reel, of a rake pivotally mounted on the reel and serving to discharge the cut grain from the platform, an arm pivotally mounted on the reel, a transverse bar carried by the arm, a connection between the arm and the rake, a guide mounted on a fixed portion of the apparatus, and a roll carried by the arm whereby the guide will contact with the roll as the reel rotates and temporarily retard the movement of the arm and its bar, causing, at the same time, a movement of the rake independent of the reel, facilitating the discharge of the grain from the platform and preventing the deposit of freshly-cut grain during such discharge.

5. In a harvester, the combination, with a grain-platform, and means for periodically raising and lowering the same, of a rotary reel, a rake pivotally mounted on the reel and serving to discharge the cut grain from the platform, an arm pivotally mounted on the reel, a transverse bar carried by the arm, a connection between the arm and the rake, and means for retarding the motion of the arm, whereby the rake will discharge the grain from the platform and the transverse bar will serve to prevent the deposit of freshly-cut grain during such discharge.

6. In a harvester, the combination, with a grain-platform, a reel, a segmental guide-plate, a roll traveling in the guide and a connection between the roll and the platform, of a rake pivotally mounted on the reel, an arm pivotally mounted on the reel, a transverse bar carried by the arm immediately behind the rake, a connection between the arm and the rake, means carried by the reel for releasing the roll and allowing the platform to drop, of means operating simultaneously to retard the onward movement of the arm, whereby the rake will discharge the cut grain from the lowered platform and the transverse bar will prevent the deposit of freshly-cut grain during such discharge.

7. In a harvester, the combination, with a grain-platform, a reel, a segmental guide-plate, a roll traveling in the guide, an arm carried by the reel and operating to push the roll upward in the guide, a recess for the retention of the roll in its uppermost position, a lever pivoted near the recess, a second arm carried by the reel and operating to contact with the lever and expel the roll from the recess, and a connection between the roll and the platform whereby the platform will be periodically raised and lowered as the reel rotates, of a rake pivotally mounted on the reel, an arm pivotally mounted on the reel, a transverse bar carried by the arm and occupying a position immediately following the rake, a stationary guide-plate, and a roll carried by the arm in such position as to contact with the guide-plate at the moment the roll is expelled from the recess, whereby the rake will be actuated in such manner as to facilitate the discharge of the grain from the platform and the bar will temporarily prevent the deposit of freshly-cut grain during such discharge.

In testimony whereof I affix my signature to this specification in the presence of two witnesses.

BERNARD HOLTHAUS.

Witnesses:
 FR. HOYERMANN,
 C. DIEDERICH.